No. 892,579. PATENTED JULY 7, 1908.
E. H. CALLAWAY.
VALVE FOR THE AIR DUCTS OF BRICK KILNS AND THE LIKE.
APPLICATION FILED APR. 15, 1907.
2 SHEETS—SHEET 1.
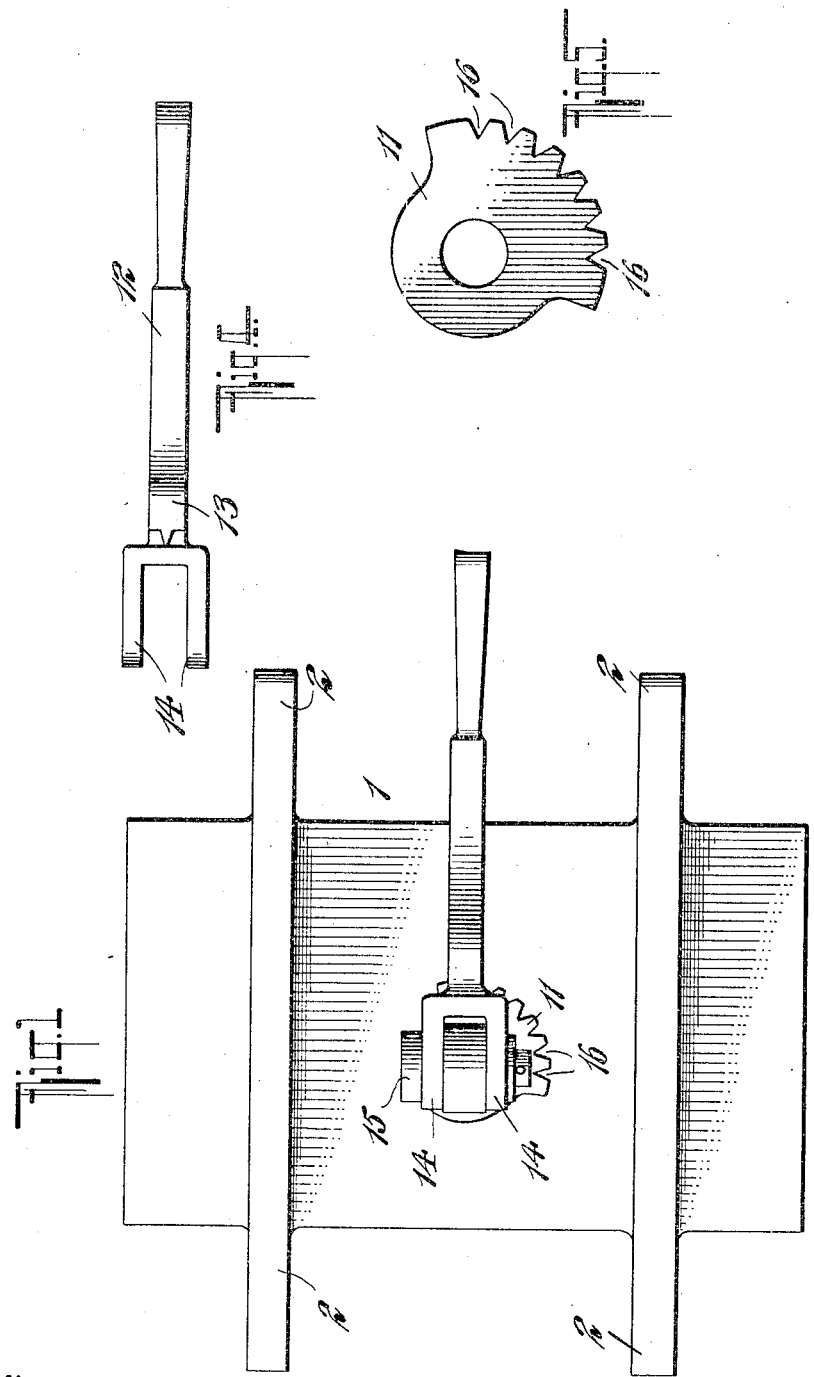
Witnesses
Inventor
Edward H. Callaway,
By his Attorney

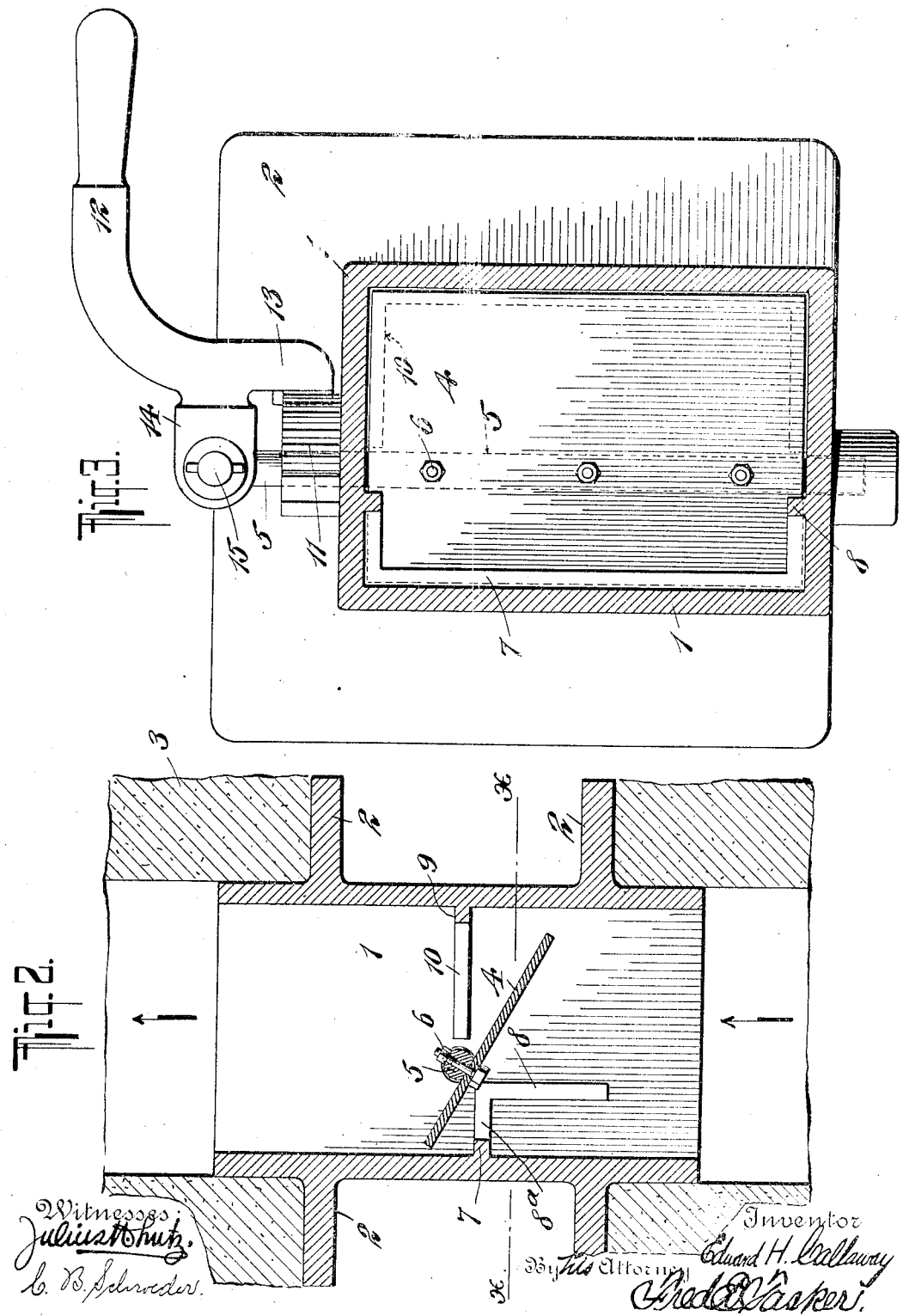

UNITED STATES PATENT OFFICE.

EDWARD H. CALLAWAY, OF WESTFIELD, NEW JERSEY, ASSIGNOR TO THE AMERICAN CLAY MACHINERY COMPANY, OF NEW YORK, N. Y., A CORPORATION OF OHIO.

VALVE FOR THE AIR-DUCTS OF BRICK-KILNS AND THE LIKE.

No. 892,579.  Specification of Letters Patent.  Patented July 7, 1908.

Application filed April 15, 1907. Serial No. 368,260.

*To all whom it may concern:*

Be it known that I, EDWARD H. CALLAWAY, a citizen of the United States of America, and a resident of Westfield, county of Union, State of New Jersey, have invented certain new and useful Improvements in Valves for the Air-Ducts of Brick-Kilns and the Like, of which the following is a specification.

My present invention refers to a new, useful and improved valve or damper device intended primarily for use with the air or draft ducts or passages with which brick-kilns, driers, and various other kinds of heating apparatus are customarily provided; the object thereof being to provide a valve better suited by reason of its detailed construction and the way in which it is arranged and operated to perform the required function, in combination with a duct for the purpose specified, than those now commonly in use; and the invention may therefore be said to consist in the construction, combination and arrangement of the various parts, substantially as will be hereinafter described and claimed.

In the annexed drawing, illustrating my invention, Figure 1 is a top plan view of a pipe section or casing, serving as a portion of the air duct belonging to a brick-kiln or other heating apparatus, and having the function of a casing for my improved valve or damper. Fig. 2 is a horizontal sectional view of the same. Fig. 3 is a side elevation in partial section on the line *x x* of Fig. 2 with the damper in its closed position. Fig. 4 is a detail edge view of the lever, which is one form of device for operating the valve. Fig. 5 is a detail plan view of the dentated segment that is actuated by said lever.

Similar characters of reference designate like parts throughout all the figures of the drawing.

1 denotes a pipe section serving as a valve casing, and being of rectangular form, or substantially so, being arranged with and forming a part of a brick-kiln duct for example, part of which duct is shown at 3 in Fig. 2; and said casing 1 is preferably furnished with flanges 2 to anchor the pipe or casing in the wall of this air distributing duct, the latter belonging to a kiln, drier, or other heating apparatus. Casing 1 must always be of substantially rectangular shape for a purpose to be presently seen when the corresponding shape of the valve itself is observed, and said casing may be made to vary in size, being larger or smaller as may be required. Since the duct, of which it forms a part, conveys air sometimes under very strong pressure to the kiln or other heating apparatus, it is of the highest importance that proper means should be provided for enabling the draft to be cut off, and the flow of the air to be regulated through the valve casing and through the duct. To this end I have devised my novel and useful valve or damper.

Corresponding in shape to the interior cross section of casing 1 is a neatly fitting plate or shutter 4 which constitutes the valve, and is adapted to lie across the passage in the casing 1, or the duct, so as to completely obstruct the passage of the air, as shown in Fig. 3, or to be turned to a greater or less angle, as indicated in Fig. 2, so as to allow more or less air to pass. The valve 4 is secured by means of bolts 6, or other devices, to a vertical rod 5, a portion of whose side is flattened to permit the better attachment of the valve 4 thereto. Rod 5 is journaled at top and bottom in casing 1. Its upper end projects outside of and above the casing to provide a part to which an operating handle 12 may be pivoted by means of a bolt 15 passing through ears 14 and an eye in the rod 5, as shown in Figs. 1 and 3. The handle 12 is also provided with a depending tooth 13 adapted to engage the notches 16 in the segment 11, which is cast as an integral boss on the top of the casing 1, or is secured thereto as an independent piece, or is otherwise located in some position which is stationary relatively to the rotatable pivot rod 5. The handle 12 is movable up and down in a vertical plane for the purpose of causing the tooth 13 to be engaged with or disengaged from one of the notches of the segment 11. When the tooth 13 is, as shown in Fig. 3, engaged with the segment 11, the valve is held firmly and rigidly in the position to which it may have been adjusted; and when the handle 12 is uplifted so as to withdraw the tooth 13 from segment 11, by manipulating the handle 12 the rod 5 may be rotated more or less, resulting in the opening of the valve 4 to a greater or less extent as may be required. Of course, the handle 12, with its tooth 13, is only one form of device for moving the valve on its pivot rod. Various other kinds of mechanism may be substituted and used for the same purpose with equal success.

It is important to note that the rod 5, which thus forms the pivot on which the valve 4 turns and opens or closes, is placed at one side of the central vertical line of the valve plate 4, being therefore nearer one of the outer edges thereof than the other, and being thus situated nearer one of the two vertical parallel walls of the casing 1 than to the other, as indicated in Fig. 2. This divides the surface of valve 4 into two unequal parts, the object being to enable the part which is exposed to the strong air pressure coming through the duct in the direction of the arrows indicated in Fig. 2, and which has a stop device on the opposite side thereof, against which it seats, to be pressed much more tightly against its seat than would be possible if the pivoting device were in the center of the valve, and the portions thereof on opposite sides of the pivot of equal area, for it must be observed that the part of the valve on one side of the pivoting device seats against stopping means when moved in one direction, while the part of the valve on the other side of the pivoting device seats when moved in the other direction; and it is desirable that the ampler area to receive air pressure, for the purpose of causing the valve to tightly hug its seat, should be furnished on the side exposed to the air pressure passing to the kiln. Therefore, the part of the valve 4 on one side of the pivoting device is narrower than the part on the other side. Adjacent to the narrow part, I provide the upper and lower interior surfaces of the casing 1 with right-angled ribs or ledges, having the part 8 which is parallel to the vertical sides of casing 1, and the part $8^a$ which is at a right-angle to the part 8, said right-angled ledges $8^a$ at top and bottom being connected by the vertical ledge or rib 7.

Substantially opposite to the ledges $8^a$, though offset somewhat therefrom, are ledges 10 at the top and bottom of the casing 1 on the interior surfaces thereof, said ledges 10 lying in planes parallel to the planes of the ledges $8^a$ and said ledges 10, being connected together by means of a vertical rib or ledge 9. The offsetting of the ledges 10 from the ledges $8^a$, so that instead of being in the same vertical plane they may be in parallel planes a slight distance apart, is for the purpose of accommodating between them the pivot rod 5 and to enable the valve plate 4, which is carried by said rod, to occupy a position at right angles to the vertical walls of the casing 1, when one side thereof is in contact with the ledges 9 and 10, and the other side is simultaneously in contact with the ledges 7 and $8^a$, this being the condition when the valve is closed. All these ledges, ribs, or flanges, as they may be indifferently termed, are used for the purpose of acting as stops to the movement of the valve 4.

When the valve is so turned as to open the air passage to the utmost, the wider part thereof strikes against the ledges 8, 8, and is stopped thereby, thus occupying a position parallel to the vertical sides of the casing 1; but when closed, as just explained, the wider part of the valve 4 abuts against the ledges 9 and 10, while the narrow part seats against the ledges 7 and $8^a$. Of course, the valve is susceptible of occupying any intermediate position between complete closure and full opening, one of these positions being indicated in Fig. 2, the locking device consisting of the tooth and segment serving to hold the valve in any desired position for the time being. The various ledges may be made in any desired manner, commonly integral with the casing, sometimes as separate parts; but I am not restricted to any particular way of producing or placing them. It will thus be seen that the wider part of the valve 4 is exposed to the air pressure coming in the direction of the arrow, and that consequently when the locking device is released the valve under this pressure will seat itself very firmly upon the ledges. The feature of the eccentrically placed pivoting device is of great importance in this connection, for if the valve were hung on its center axis, with equal portions on opposite sides thereof to be exposed to the air pressure, these two pressures on the opposite sides of the axis would, by balancing each other, or nearly so, make it possible for the valve to fail to properly seat itself on the ledges; but, where on one side of the pivotal device there is a wide and ample surface for the action of the pressure, the valve cannot fail to hug the ledges very closely and such small amount of pressure as may act against the narrower portion of the valve, against which there is no opposing seat at the time, will not overcome the pressure on the other face; and hence it follows that the valve is effectively seated when closed, and no air can get past it at that time.

Very many changes in the precise construction, arrangement and combination of the various parts, and in the details of the mechanical features thereof, may be made without varying from the invention.

Obviously, there may be some cases where the valve may be centrally instead of eccentrically pivoted with good results, and in any such case the arrangement of the ledges which pass, when both seats are considered, substantially around the interior of the casing 1 provide a nearly rectangular seat for the valve; and while the valve must of necessity work somewhat loosely or have enough clearness to enable it to move easily, still a tight joint is effected when the valve is closed against the ledges.

Having thus described my invention, what I claim as new and desire to secure by Letters Patent, is:

1. In a valve or damper for the air draft of kilns, driers, and the like, the combination with a duct, of a valve proper, having a pivotal axis nearer one edge of the valve than the other, so as to divide it into two parts of unequal size, and stop means against which the valve abuts when closed and when fully opened, said stop means consisting of ledges running around the interior of said duct in such a manner that the valve may seat closely against the same, the ledges for one portion of the valve being on one side thereof and the ledges for the other portion being on the other side, and there being also ledges in line with the axis of the duct for the full opening of the valve.

2. In a valve for the air draft of brick-kilns, driers, and the like, the combination of a rectangular valve casing, a rectangular valve therein, a pivot rod for the valve situated outside of the center line of the latter, and stop devices consisting of ledges on the interior of the casing for the purpose of furnishing abutments against which the valve strikes when fully open and when closed, said ledges being integral with the casing and those on one side of the valve lying in one transverse plane and those on the opposite side in a parallel transverse plane, while a portion of the ledges lie in an axial location to permit the full opening of the valve.

3. A valve mechanism for the air ducts of kilns, driers, and the like, consisting in the combination with a rectangular casing seated in the duct, of a valve device having an eccentric pivot, stops against which the valve seats in closing, and stops for holding the valve in a position parallel to the sides of the casing when fully open, said stops all consisting of integral ledges formed on the inner surface of the casing, those on one side of the valve being in one transverse plane, those on the other side being in a parallel transverse plane, and those which permit the full opening being parallel to the axis of the casing together with locking means consisting of a movable handle provided with a tooth and connected to the pivot device, and a stationary segment engageable by said tooth.

4. The combination with a rectangular casing forming part of the air duct of kilns, driers, and the like, of an internal correspondingly-shaped valve plate, means carrying said valve at a point outside of the center axial line so as to divide it into two unequal portions, to afford a broader surface for the air pressure on one side of the pivot than on the other, ledges or ribs forming stop devices against which the valve seats in closing and also when open, and means for holding the valve in any desired open position, said ledges being integral with the interior surface of the casing, and those on one side of the valve being in one transverse plane, while those on the other side are in a parallel transverse plane, while those that permit full opening are at right-angles to the others and parallel to the axis of the casing.

5. The combination with a rectangular casing, of a correspondingly-shaped valve, means for pivoting the valve so that one portion thereof will be wider than the other, upper and lower integral ledges having a connecting ledge situated in the same transverse plane on one side of the valve against which the valve closely seats, and similar upper and lower ledges having a connecting ledge and situated on the opposite side of the valve in a parallel transverse plane so that the other side of the valve may tightly seat against the said ledges, and right-angled ledges above and below arranged parallel to the axis of the casing on one side of the valve to permit full opening of the valve at times, all substantially as described.

Signed at New York city, this 8th day of April, 1907.

EDWARD H. CALLAWAY.

Witnesses:
JOHN H. HAZELTON,
C. B. SCHROEDER.